(12) United States Patent
Asato et al.

(10) Patent No.: US 7,839,961 B2
(45) Date of Patent: Nov. 23, 2010

(54) COMMUNICATION TIMING CHANGING METHOD AND DEVICE

(75) Inventors: Seishin Asato, Chiba (JP); Akira Matsui, Kanagawa (JP); Naoki Hayashi, Chiba (JP); Tomoki Numata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1331 days.

(21) Appl. No.: 11/345,502

(22) Filed: Feb. 2, 2006

(65) Prior Publication Data
US 2006/0193412 A1     Aug. 31, 2006

(30) Foreign Application Priority Data
Feb. 25, 2005  (JP)  ............... 2005-050606

(51) Int. Cl.
*H04L 7/00* (2006.01)
(52) U.S. Cl. .................................. 375/354; 348/434.1
(58) Field of Classification Search ............. 348/384.1, 348/426.1, 432.1, 434.1, 435.1, 542, 544, 348/545; 375/240, 316, 324, 328, 346, 351, 375/362–363
See application file for complete search history.

(56) References Cited

U.S. PATENT DOCUMENTS

| | | | | |
|---|---|---|---|---|
| 4,559,645 | A | * 12/1985 | Horikawa | 382/255 |
| 4,604,615 | A | * 8/1986 | Funahashi | 345/567 |
| 5,966,173 | A | * 10/1999 | Inuiya et al. | 348/296 |
| 6,608,651 | B2 | * 8/2003 | Mabuchi et al. | 348/335 |
| 2004/0008388 | A1 | * 1/2004 | Tanaka | 358/513 |
| 2004/0076119 | A1 | * 4/2004 | Aronson et al. | 370/249 |
| 2008/0191995 | A1 | * 8/2008 | Cheon et al. | 345/101 |

FOREIGN PATENT DOCUMENTS

| | | | |
|---|---|---|---|
| JP | 10-233955 | | 9/1998 |
| JP | 10-242443 | | 9/1998 |
| JP | 2003-116044 | * | 4/2003 |

* cited by examiner

*Primary Examiner*—David C Payne
*Assistant Examiner*—James M Perez
(74) *Attorney, Agent, or Firm*—Oblon, Spivak, McClelland, Maier & Neustadt, L.L.P.

(57) ABSTRACT

The invention aims at providing communication timing changing method and device which are capable of changing timing of communication for setting control parameters used to determine operations of analog devices in the analog devices, respectively, over to another one not impeding any of the operation of the analog devices. An interface decoder decodes a control parameter communication signal outputted from a CPU, converts the resulting signal into control parameters, and preserves the resulting control parameters in a register. Interface encoders perform timing management based on a synchronous signal received from a synchronous signal generating circuit, read out the control parameters to be set in analog devices such as an image sensor driving circuit, a sample and hold circuit, and an ADC from a register, and communicate with the analog devices at good timing during a blanking period to set the control parameters in the analog devices, respectively.

9 Claims, 8 Drawing Sheets

FIG. 3

FIG. 4A IMAGE SIGNAL
FIG. 4B SYNCHRONOUS SIGNAL
FIG. 4C CONTROL PARAMETER COMMUNICATION SIGNAL CPU→IC
FIG. 4D CONTROL PARAMETER COMMUNICATION SIGNAL IC→ANALOG DEVICES

COMMUNICATION TIMING CHANGING METHOD AND DEVICE

CROSS REFERENCES TO RELATED APPLICATIONS

The present invention contains subject matter related to Japanese Patent Application JP 2005-050606 filed in the Japanese Patent Office on Feb. 25, 2005, the entire contents of which being incorporated herein by reference.

BACKGROUND OF THE INVENTION

The present invention relates to communication timing changing method and device which are capable of changing timing of communication, made between a CPU and analog devices, for setting control parameters used to determine operation modes of the analog devices in the analog devices, respectively, over to another one which does not impede any of the operations of the analog devices.

Figure 6:
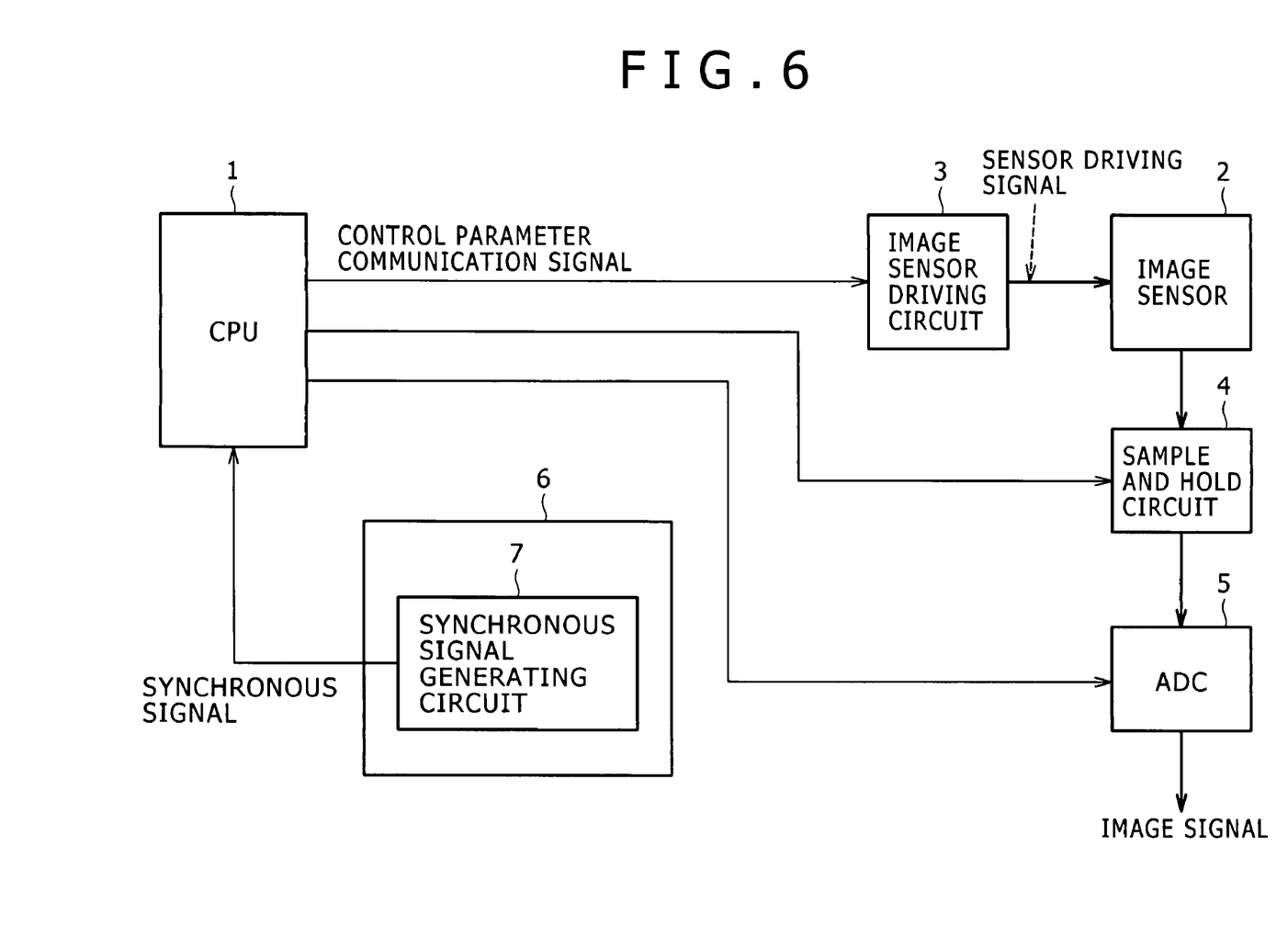
FIG. 6 is a block diagram explaining a communication timing changing method in related art.

FIG. 6 is a block diagram explaining a communication timing changing method in related art when control parameters are set in analog devices including an image sensor within an image pickup device, respectively. The image pickup device includes an image sensor 2, an image sensor driving circuit 3, a sample and hold circuit 5, and an analog/digital converter (hereinafter referred to as "an ADC") 5 as analog devices.

A CPU 1 controls all of or a part of the image pickup device by setting control parameters in the analog devices within the image pickup device, respectively. The image sensor 2 converts optical information into an electrical signal through photoelectric conversion. The image sensor driving circuit 3 generates sensor driving signals containing various kinds of timing signals used to drive the image sensor 2. The sample and hold circuit 4 holds an image signal converted into an electrical signal in the image sensor 2 in the form of an analog value during a given period of a certain cycle. The ADC 5 digitally converts the image signal held in the form of the analog value in the sample and hold circuit 4 during a hold period. A synchronous signal generating circuit 7 is configured in the form of an integrated circuit (IC) 6. The synchronous signal generating circuit 7 generates a synchronous signal used to regulate timing when the CPU 1 makes communication for control parameters with the image sensor 2, the image sensor driving circuit 3, the sample and hold circuit 4, and the ADC 5.

Next, an operation will be described.

The CPU 1 directly sets control parameters used to determine operation modes of the analog devices such as the image sensor 2, the image sensor driving circuit 3, the sample and hold circuit 4, and the ADC 5 within the image pickup device through control parameter communication. The CPU 1 receives a synchronous signal from the synchronous signal generating circuit 7 within the IC 6, transmits the control parameters to the analog devices at good timing, respectively, and controls the image sensor 2, the image sensor driving circuit 3, the sample and hold circuit 4, and the ADC 5, thereby obtaining the image signal.

Now, in the case of the image pickup device, a device needs to be made so as to prevent the noises from being superimposed on the image signal in the analog devices.

Figure 7:
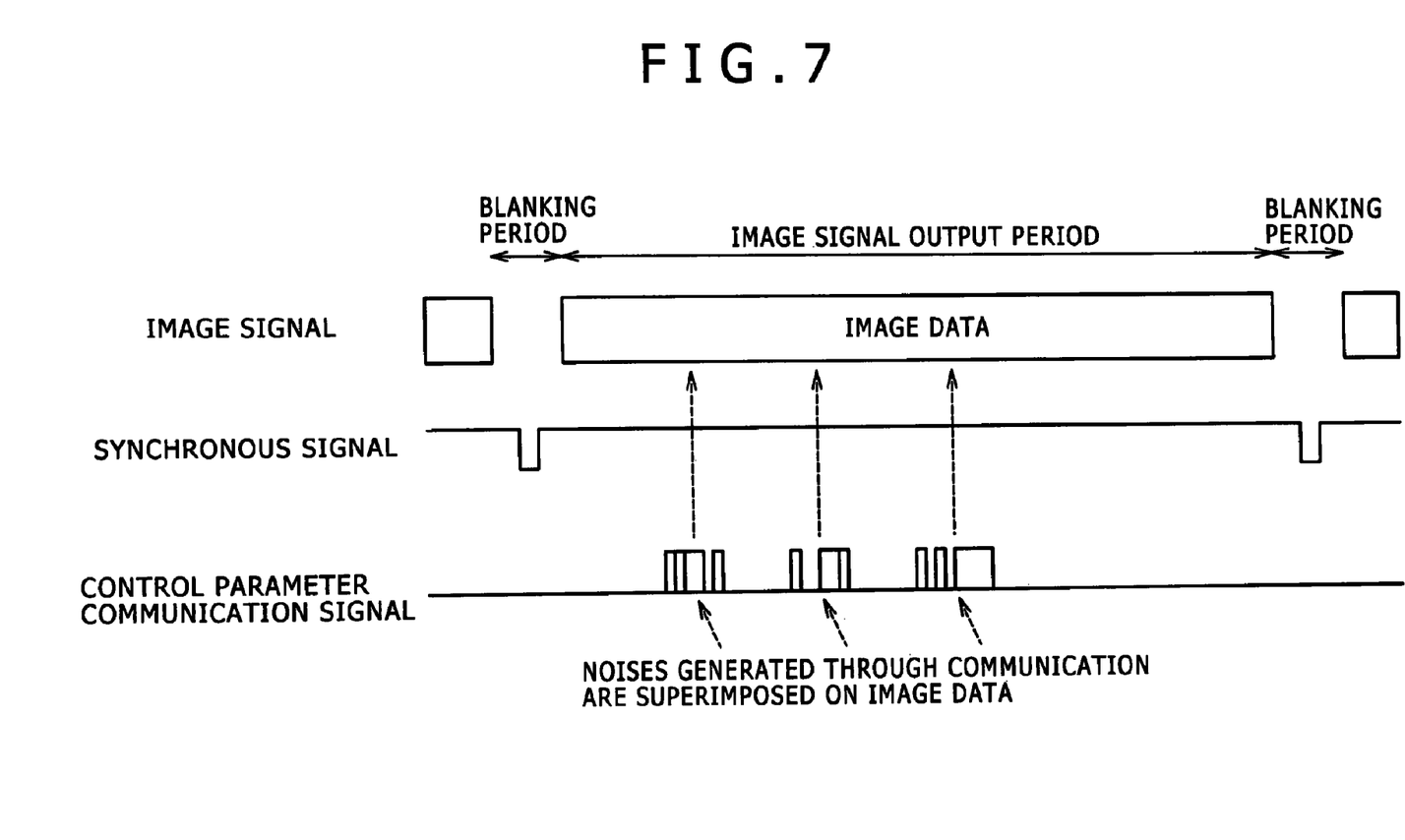
FIG. 7 is a timing chart showing a relationship among an image signal and a synchronous signal when control parameters are communicated during an image signal output period, and timing at which the control parameters are communicated.

FIG. 7 is a timing chart showing a relationship among the image signal which is obtained in a series of processing executed by the analog devices when the control parameters are communicated for a during an image signal output period, the synchronous signal generated by the synchronous signal generating circuit 7, and the timing at which the control parameters are communicated. When the control parameters are communicated during the image signal output period, if the image signal gets mixed with the communication signal itself, the communication signal appears in the form of the noises. The mixing the image signal with the noises is not preferable in terms of the image pickup device.

As for a method of avoiding this, there is known a method of communicating control parameters during a blanking period of the image sensor 2 as disclosed, for example, in Japanese Patent Laid-Open No. 2003-116044.

Figure 8:
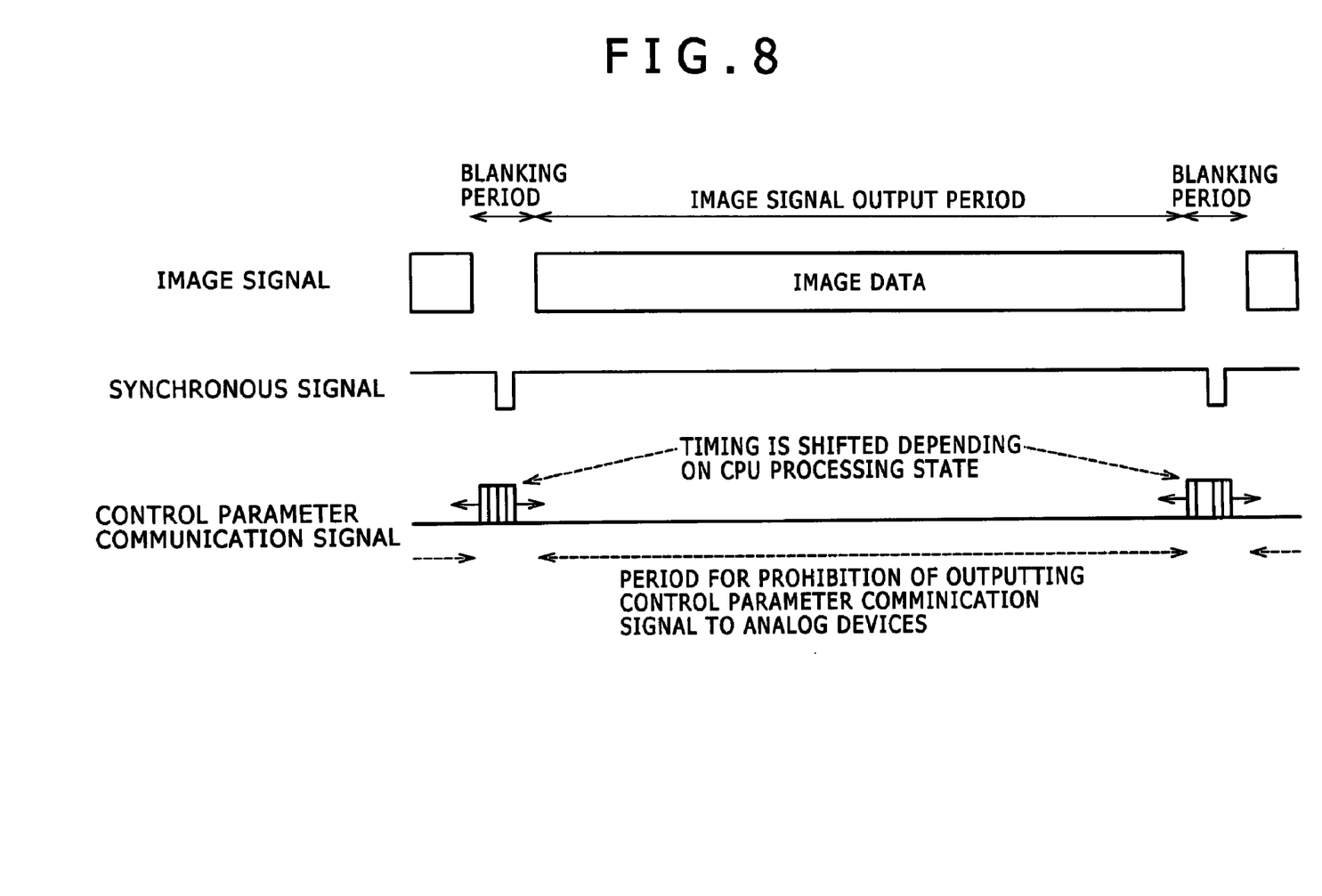
FIG. 8 is a timing chart showing a relationship among an image signal and a synchronous signal when control parameters are communicated during a blanking period, and timing at which the control parameters are communicated.

FIG. 8 is a timing chart showing a relationship among the image signal outputted from the analog devices when the control parameters are communicated during the blanking period, the synchronous signal generated by the synchronous signal generating circuit 7, and the timing at which the control parameters are communicated. According to the timing chart shown in FIG. 8, the image signal output period from the analog devices is made during a period which a communication signal on control parameters is prohibited from being communicated, and the communication of the control parameters is made during the blanking period. Thus, the individual timing is prevented from overlapping one another so that the image signal does not get mixed with the communication signal on the control parameters. In addition, while the communication timing is not fixed depending on the processing contents (an interrupt or the like) of the CPU 1, the communication processing is executed with some room being taken.

SUMMARY OF THE INVENTION

The communication timing changing method and device in related art as described above involve the following shortcomings. That is, actually, the image reading technique for the image sensor has developed, and the blanking period which no data on an image is read out has been shortened. In addition, the function of the image pickup device has been diversified, so that the contents to be processed in the CPU have increased and a large number of tasks have been generated. As a result, it has been difficult to make the communication of the control parameters at the convenient timing. From these reasons, there is encountered such a problem that it has become difficult to make the communication of the control parameters with the respective analog devices during the blanking period.

Several avoidance measures have been discussed for this problem. A first avoidance measure is a method of increasing a CPU clock frequency, and is such that CPU task processing is speedily executed, thereby giving the communication a room.

In addition, a second avoidance measure is a method of making the communication during the image signal output period. Thus, the second avoidance measure is such that when no communication can be made during the blanking period, noise measures are devised so that the analog devices or the circuit substrate having the analog devices used in combination with one another is not influenced by the communication noises.

When the avoidance measures as described above are adopted, the former involves such a problem that the CPU consumes much power, and this is not preferable in terms of the actual use. On the other hand, in the case of the latter, the noise measures are not technically easy to devise, and the measures must be taken into consideration in a stage of development of the analog devices, and in a stage of design of the circuit substrate. As a result, there is encountered such a problem that the cost is increased due to an increase in circuit scale, an increase in difficulty of wiring distribution on the circuit substrate, an increase in the number of components or parts such as a capacitor for noise removal, and the like.

The present invention has been made in the light of the circumstances as described above, and it is desirable to provide communication timing changing method and device which are capable of changing timing of communication for setting control parameters used to determine operation modes of analog devices in the analog devices, respectively, over another one which does not impede any of operations of the analog devices without an increase in power consumption and cost of a CPU such as an increase in operating speed of the CPU.

According to an embodiment of the present invention, there is provided a communication timing changing method of changing timing of communication for setting control parameters used to determine operation modes of analog devices from a CPU in the analog devices, respectively, over to another one corresponding to a period which does not impede any of operations of the analog devices, the method including the steps of: generating a synchronous signal synchronized with the period not impeding any of the operations of the analog devices by a synchronous signal generating circuit; transferring the control parameters used to determine the operation modes of the analog devices from the CPU to a register during operation periods of the analog devices except for the period not impeding any of the operations of the analog devices to preserve the control parameters in the register based on the synchronous signal generated by the synchronous signal generating circuit; and managing timing of communication, between the register and the analog devices, for setting the control parameters preserved in the register in the analog devices, respectively, synchronously with the period not impeding any of the operations of the analog devices by an interface encoder based on the synchronous signal generated by the synchronous signal generating circuit.

According to another embodiment of the present invention, there is provided an electronic device for changing timing of communication for setting control parameters used to determine operation modes of analog devices from a CPU in the analog devices, respectively, over to another one corresponding to a period which does not impede any of operations of the analog devices, the electronic device including: a synchronous signal generating circuit for generating a synchronous signal synchronized with the period not impeding any of the operations of the analog devices; a register for transferring the control parameters used to determine the operation modes of the analog devices from the CPU thereto during operation periods of the analog devices except for the period not impeding any of the operations of the analog devices to preserve the control parameters therein based on the synchronous signal generated by the synchronous signal generating circuit; and a communication section for making communication, with the analog devices, for setting the control parameters preserved in the register in the analog devices, respectively, synchronously with the period not impeding any of the operations of the analog devices based on the synchronous signal generated by the synchronous signal generating circuit.

According to the present invention, the communication for setting the control parameters used to determine the operation modes of the analog devices in the analog devices, respectively, is made during the period which does not impede any of the operations of the analog devices when viewed from the analog device side. Hence, a bad influence is prevented from being exerted on any of the operations of the analog devices. In addition, the interface encoder manages the timing of the communication for setting the control parameters in the analog devices, respectively, based on the synchronous signal. Hence, the timing management becomes easy to perform, and the full period which does not impede any of the operations of the analog devices can be effectively used. As a result, there is offered such an effect that it is possible to provide the communication timing changing method and device which are capable of changing the timing of the communication for setting the control parameters used to determine the operation modes of the analog devices in the analog devices, respectively, over to another one corresponding to the period which does not impede any of the operations of the analog devices without an increase in power consumption and cost of the CPU such as an increase in operating speed of the CPU.

DETAILED DESCRIPTION OF THE PREFERRED EMBODIMENTS

The purpose of providing a communication timing changing method which is capable of changing timing of communication for setting control parameters used to determine operation modes of analog devices in the analog devices, respectively, over to another one which does not impede any of operations of the analog devices without increasing power consumption and cost of a CPU is realized by: generating a synchronous signal synchronized with the period not impeding any of the operations of the analog devices by a synchronous signal generating circuit; transferring the control parameters used to determine the operation modes of the analog devices from the CPU to a register during operation periods of the analog devices except for the period not impeding any of the operations of the analog devices to preserve the control parameters in the register based on the synchronous signal generated by the synchronous signal generating circuit; and managing timing of communication, between the register and the analog devices, for setting the control parameters preserved in the register in the analog devices, respectively, synchronously with the period not impeding any of the operations of the analog devices by an interface encoder based on the synchronous signal generated by the synchronous signal generating circuit.

In addition, the purpose of providing an electronic device which is capable of changing timing of communication for setting control parameters used to determine operation modes of analog devices in the analog devices, respectively, over to another one which does not impede any of operations of the analog devices without increasing power consumption and cost of a CPU is realized by: generating a synchronous signal synchronized with the period not impeding any of the operations of the analog devices by a synchronous signal generating circuit; transferring the control parameters used to determine the operation modes of the analog devices from a CPU to a register during operation periods of the analog devices except for the period not impeding any of the operations of the analog devices to preserve the control parameters in the register based on the synchronous signal generated by the synchronous signal generating circuit by the CPU; and making communication, with the analog devices, for setting the control parameters preserved in the register in the analog devices, respectively, synchronously with the period not impeding any of the operations of the analog devices based on the synchronous signal generated by the synchronous signal generating circuit by a communication section.

Embodiment 1

Figure 1:
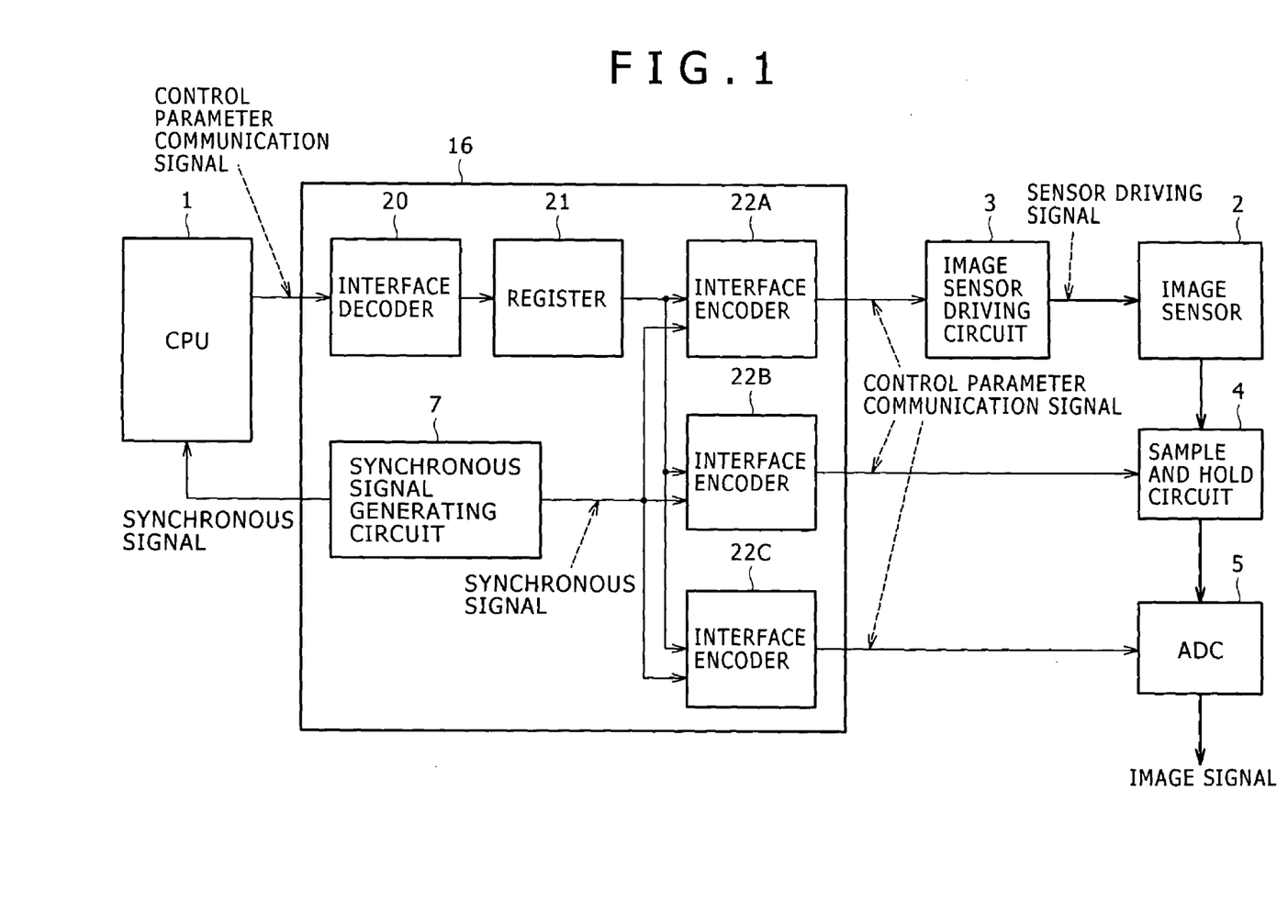
FIG. 1 is a block diagram showing a configuration of an image pickup device to which a communication timing changing method according to an embodiment 1 of the present invention is applied.

FIG. 1 is a block diagram showing a configuration of an image pickup device to which a communication timing changing method according to an embodiment 1 of the present invention is applied. The block diagram of FIG. 1 shows analog devices including an image sensor within the image pickup device, a CPU, and an integrated circuit interposed between the analog devices and the CPU. The timing of communication of control parameters made from the CPU to the analog devices is changed over to another one which does not impede any of operations of the analog devices through the integrated circuit, and control parameters are set in the analog devices, respectively.

The image pickup device includes an image sensor 2, an image sensor driving circuit 3, a sample and hold circuit 4, and an analog/digital converter (hereinafter referred to as "an ADC") 5 as analog devices.

An integrated circuit 16 is interposed between the CPU 1 and the analog devices. The CPU 1 can control all of or a part of the image pickup device by setting control parameters in the analog devices within the image pickup device, respectively.

The image sensor 2 converts optical information into an electrical signal through photoelectric conversion. The image sensor driving circuit 3 generates sensor driving signals containing various kinds of timing signals used to drive the image sensor 2. The sample and hold circuit 4 holds an image signal which is converted into an electrical signal in the image sensor 2 in the form of an analog value for a given period of a certain cycle. The ADC 5 digitally converts the image signal held in the form of the analog value in the sample and hold circuit 4 during a hold period.

The integrated circuit 16 includes a synchronous signal generating circuit 7, an interface decoder 20, a register 21, and interface encoders (a communication section) 22A, 22B and 22C.

Incidentally, the synchronous signal generating circuit 7, the interface decoder 20, the register 21, and the interface encoders 22A, 22B and 22C of the integrated circuit 16 constitute a semiconductor device (electronic device) for realizing the communication timing changing method according to the embodiment 1 of the present invention. The semiconductor device changes timing of communication for setting the control parameters used to determine the operation modes of the analog devices in the analog devices, respectively, over to another one which does not impede any of the operations of the analog devices, i.e., another one corresponding to a blanking period without increasing power consumption and cost of the CPU 1.

In the communication timing changing method according to the embodiment 1 of the present invention, the interface encoders 22A, 22B and 22C are provided so as to correspond to the analog devices such as the image sensor driving circuit 3, the sample and hold circuit 4, and the ADC 5, respectively. The synchronous signal generating circuit 7 generates a synchronous signal used to regulate timing about the blanking period which no image signal is outputted. Communication for transferring and storing the control parameters set in the analog devices in the register 21 at arbitrary timing except for timing corresponding to the blanking period which no image signal is outputted is made between the CPU 1 and the integrated circuit 16. For this reason, the synchronous signal generated by the synchronous signal generating circuit 7 is supplied to the CPU 1. In addition, during the blanking period which no image signal is outputted, communication for setting the control parameters stored in the register 21 in the analog devices, respectively, is made between the integrated circuit 16 and the analog devices such as the image sensor driving circuit 3, the sample and hold circuit 4, and the ADC 5. Thus, the synchronous signal generated by the synchronous signal generating circuit 7 is also supplied to the interface encoders 22A, 22B and 22C, respectively.

The synchronous signal generated by the synchronous signal generating circuit 7 is a signal which is synchronized with the blanking period of the image signal. A frequency of an actuating clock signal which is supplied to the interface encoders 22A, 22B and 22C, respectively, is higher than that of an actuating clock signal supplied to the CPU 1. The interface encoders 22A, 22B and 22C make communication for setting the control parameters in the analog devices within the blanking period with the analog devices, respectively.

The interface decoder 20 decodes a control parameter communication signal outputted from the CPU 1 into the control parameters. The register 21 temporarily stores therein the control parameters obtained from the interface decoder 20 through the decoding.

It should be noted that a configuration may be adopted such that the interface decoder 20 and the register 21 are provided so as to correspond to the interface encoders 22A, 22B and 22C, respectively.

The interface encoder 22A performs the timing management based on the synchronous signal received from the synchronous signal generating circuit 7. Also, the interface encoder 22A reads out the control parameter to be set in the image sensor driving circuit 3 from the register 21, communicates with the image sensor driving circuit 3 at good timing during the blanking period while converting the control parameter into the control parameter communication signal, and sets the control parameter in the image sensor driving circuit 3. In addition, the interface encoder 22B performs the timing management based on the synchronous signal received from the synchronous signal generating circuit 7. Also, the interface encoder 22B reads out the control parameter to be set in the sample and hold circuit 4 from the register 21, communicates with the sample and hold circuit 4 at good timing during the blanking period while converting the control parameter into the control parameter communication signal, and sets the control parameter in the sample and hold circuit 4. In addition, the interface encoder 22C performs the timing management based on the synchronous signal received from the synchronous signal generating circuit 7. Also, the interface encoder 22C reads out the control parameter to be set in the ADC 5 from the register 21, communicates with the ADC 5 at good timing during the blanking period while converting the control parameter into the control parameter communication signal, and sets the control parameter in the ADC 5.

That is, in the embodiment 1, the control parameters used to regulate the operation modes of the image sensor driving circuit 3, the sample and hold circuit 4, and the ADC 5 are set from the interface encoders 22A, 22B and 22C which are provided so as to correspond to the image sensor driving circuit 3, the sample and hold circuit 4, and the ADC 5, respectively, in parallel for the blanking period.

Next, an operation will be described.

Figure 2A:
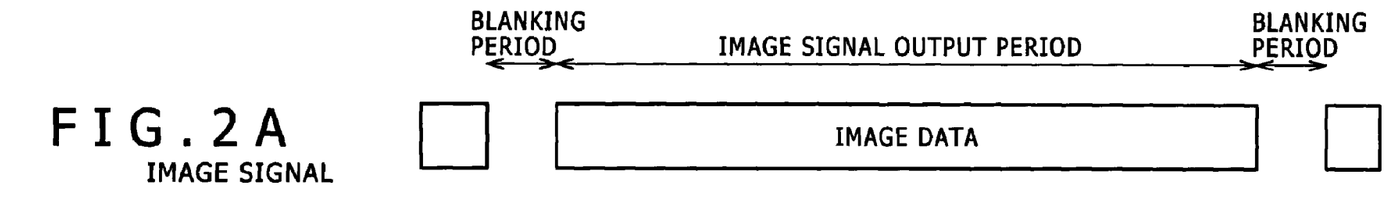
FIGS. 2A to 2D are timing charts explaining an operation made by utilizing the communication timing changing method according to an embodiment 1 of the present invention.
Figure 2B:
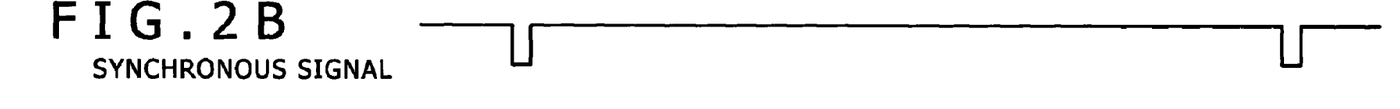
Figures 2C, 2D:
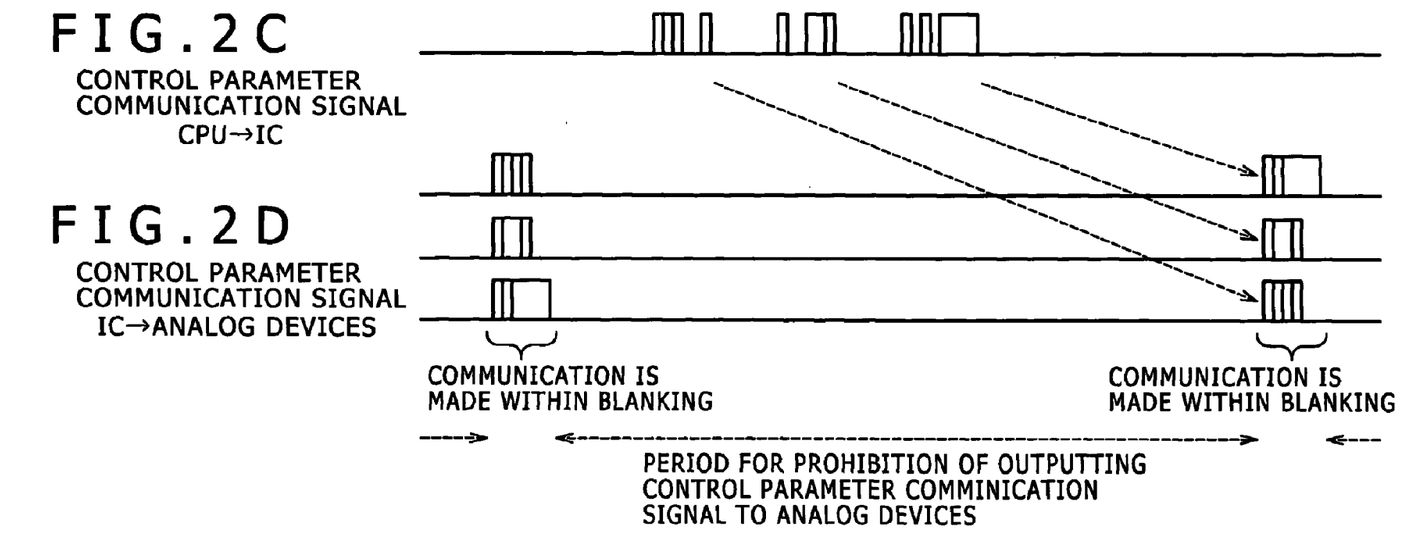

FIGS. 2A to 2D are a timing chart explaining the operation made by utilizing the communication timing changing method according to the embodiment 1 of the present invention. FIG. 2A shows the image signal obtained from the analog devices. In addition, FIG. 2B shows the synchronous signal obtained from the synchronous signal generating circuit 7. Also, FIG. 2C shows a control parameter communication signal outputted at arbitrary timing from the CPU 1 to the interface decoder 20 of the integrated circuit 16. Also, FIG. 2D shows the timing managed based on the synchronous signal, i.e., the timing at which the control parameter communication signals are outputted from the interface encoders 22A, 22B and 22C to the analog devices during blanking period, respectively.

In the communication timing changing method according to the embodiment 1 of the present invention, as shown in FIG. 2C, the control parameters which are sent at arbitrary timing from the CPU 1 is temporarily buffered in the register 21 of the integrated circuit 16 interposed between the CPU 1 and the analog devices. Thereafter, as shown in FIG. 2D, the control parameters are outputted at good timing from the interface encoders 22A, 22B and 22C of the integrated circuit 16 to the analog devices such as the image sensor driving circuit 3, the sample and hold circuit 4, and the ADC 5 to be set therein, respectively, during the period which no image signal is read out in the image sensor 2, i.e., the blanking period as a target.

The communication for setting the control parameters in the analog devices such as the image sensor driving circuit 3, the sample and hold circuit 4, and the ADC 5, respectively, is made during the blanking period in the manner as described above. As a result, the communication signals are prevented from exerting an influence on the image signal within the analog devices to appear in the form of communication noises in the image.

Next, the operation made by utilizing the communication timing changing method of the embodiment 1 will be described with reference to the block diagram of FIG. 1.

The CPU 1 sets the control parameter communication signal in the interface decoder 20 within the integrated circuit 16 through the communication at the arbitrary timing except the blanking period of the image signal. The interface decoder 20 decodes the control parameter communication signal to generate the control parameters, and writes the resulting control parameters to the register 21. The interface decoder 20 communicates with the CPU 1 plural times, and repeatedly performs the procedure-described above to write the control parameters to be set in the analog devices such as the image sensor driving circuit 3, the sample and hold circuit 4, and the ADC 5 to the register 21. After completion of the general communication, the interface encoders 22A, 22B and 22C fetch the control parameters from the register 21, encode the control parameters and convert into the control parameter communication signals, and communicates the control parameter communication signals used to set the control parameters in the analog devices such as the image sensor driving circuit 3, the sample and hold circuit 4, and the ADC 5, respectively, at the timing agreeing with the timing corresponding to the blanking period based on the synchronous signal generated by the synchronous signal generating circuit 7.

As described above, according to the embodiment 1, the communication for setting the control parameters used to determine the operation modes of the analog devices in the analog devices, respectively, is made during the blanking period when viewed from the analog device side. Hence, the image signal is prevented from getting mixed with the control parameter communication signals as the noises.

In addition, the interface encoders 22A, 22B and 22C manage the timing of the communication for setting the control parameters in the analog devices, respectively, based on the synchronous signal. Hence, the timing at which the control parameters are set is prevented from being changed depending on the situation of execution of the tasks of the CPU 1 as in the related art where the CPU 1 directly communicates with the analog devices in order to set the control parameters in the analog devices, respectively. Consequently, there is offered such an effect that the timing management becomes easy to perform, and thus the full blanking period can be effectively used.

That is, there is offered such an effect that it is possible to provide the communication timing changing method and device which are capable of changing the timing of the communication for setting the control parameters used to determine the operation modes of the analog devices in the analog devices, respectively, over to another one corresponding to the blanking period without an increase in power consumption and cost of the CPU 1 such as an increase in operating speed of the CPU 1.

Embodiment 2

Figure 3:
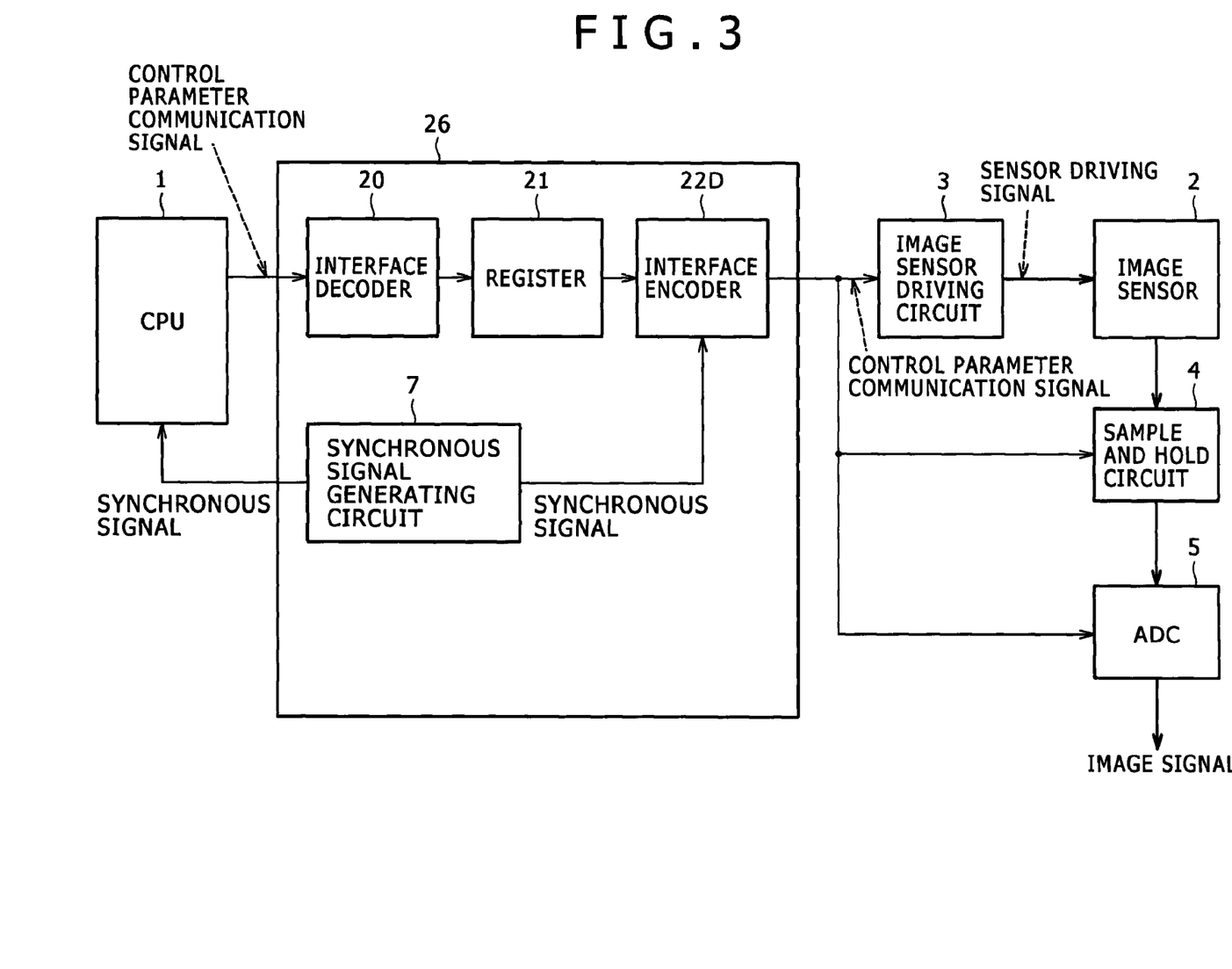
FIG. 3 is a block diagram showing a configuration of an image pickup device to which a communication timing changing method according to an embodiment 2 of the present invention is applied.
Figure 4A:
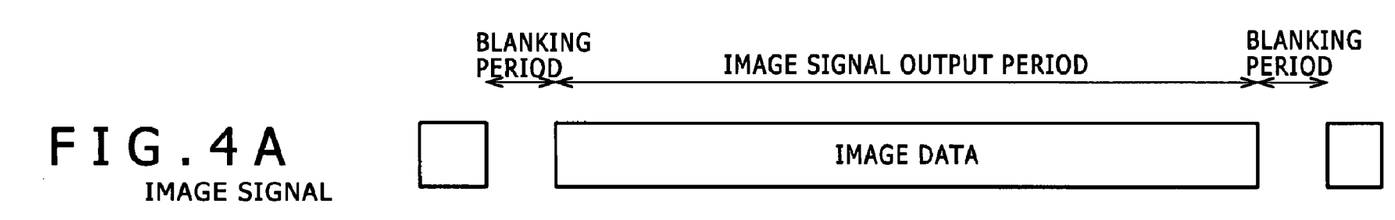
FIGS. 4A to 4D are timing charts explaining an operation made by utilizing the communication timing changing method according to an embodiment 2 of the present invention.
Figure 4B:
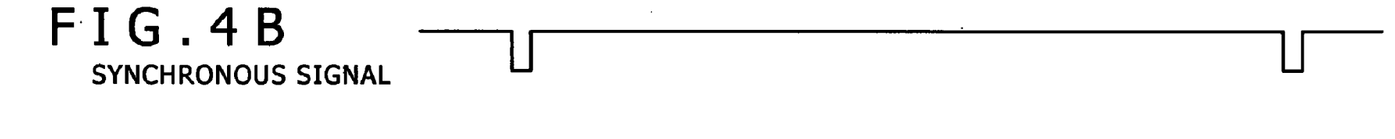
Figure 4C:
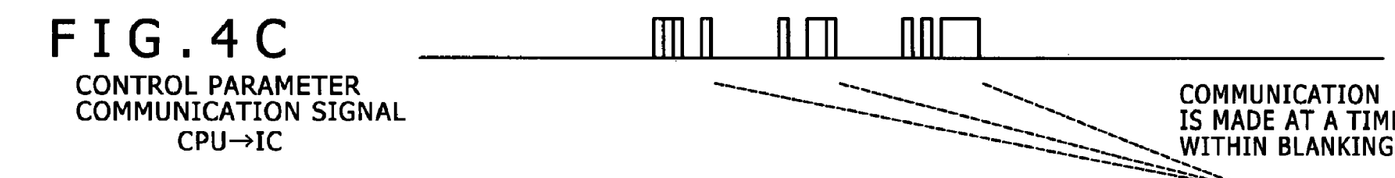
Figure 4D:
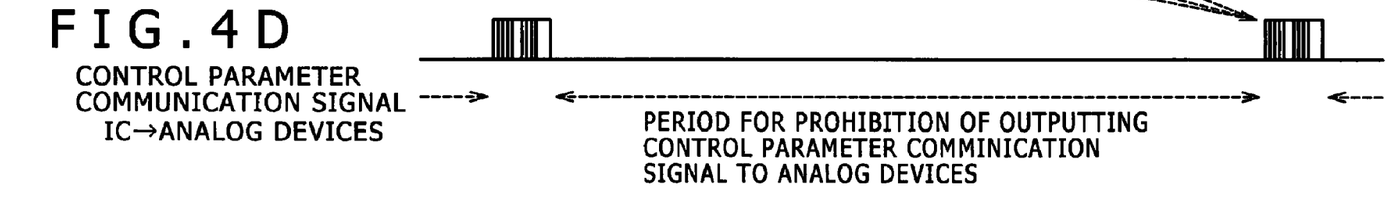

FIG. 3 is a block diagram showing a configuration of an image pickup device to which a communication timing changing method according to an embodiment 2 of the present invention is applied. In FIG. 3, portions identical or corresponding to those shown in FIG. 1 are designated with the same reference numerals, and a description thereof is omitted here. A point of difference of the embodiment 2 from the embodiment 1 described above is that in the embodiment 1 described above, the interface encoders 22A, 22B and 22C are provided so as to correspond to the image sensor driving circuit 3, the sample and hold circuit 4, and the ADC 5 as the analog devices, respectively, whereas in the embodiment 2, only the interface encoder (a communication section) 22D communicates with all the analog devices. In addition, an integrated circuit (an electronic device) 26 includes the synchronous signal generating circuit 7, the interface decoder 20, the register 21 and the interface encoder 22D.

In this case, it becomes difficult to make the communication within the limited blanking period since an amount of communication of the control parameters increases. However, the speed of the processing operation of the interface encoder 22 is increased, whereby as shown in a timing chart of FIG. 4, it is possible to make the communication at a time within the blanking period. An increasing in processing speed results in an increase in power consumption of the interface encoder 22D. However, the speed of the processing executed in only the communication circuits of the interface encoder 22D and the analog devices may be increased, and thus an increase in power consumption is small.

The control parameters are set from the interface encoder 22D in the image sensor driving circuit 3, the sample and hold circuit 4, and the ADC 5 as the analog devices through the high speed serial communication. In the high speed serial communication, IDs are previously allocated to the image sensor driving circuit 3, the sample and hold circuit 4, and the ADC 5, respectively. Thus, the image sensor driving circuit 3, the sample and hold circuit 4, and the ADC 5 judge based on ID information added to the control parameter communication signal whether or not the control parameters are sent for them, respectively. The image sensor driving circuit 3, the sample and hold circuit 4, and the ADC 5 receive the control parameters only when the control parameters are sent for them, respectively.

According to the embodiment 2, since the number of control parameter communication signals from the integrated circuit 26 can be reduced, there is offered such an effect that the number of wirings on the substrate can be reduced.

In addition, in the embodiment 2 as well, when the CPU 1 makes the setting of the control parameters used to determine the operation states of the analog devices, the control parameters are stored in the register 21, and the communication for setting the control parameters from the register 21 in the analog devices, respectively, is made at the timing (blanking period) which does not impede any of the operations of the analog devices. For this reason, the CPU 1 may store the control parameters in the register 21 at arbitrary timing. As a result, restrictions, for the timing management, imposed on the CPU 1 are relaxed, and thus the programming becomes easy to make.

In addition, in the embodiment 2 as well, when the blanking period is short and the amount of communication is much, the communication processing abilities of the portions in and behind the interface encoder have to be increased. Consequently, there is offered such an effect that it is possible to provide the communication timing changing method and device which are capable of suppressing an increase in power consumption, and of preventing the image signal from getting mixed with the noises along with the communication of the control parameters while suppressing the power consumption and the cost to a necessary minimum as compared with the case where the throughput of the CPU 1 is increased.

Embodiment 3

Figure 5:
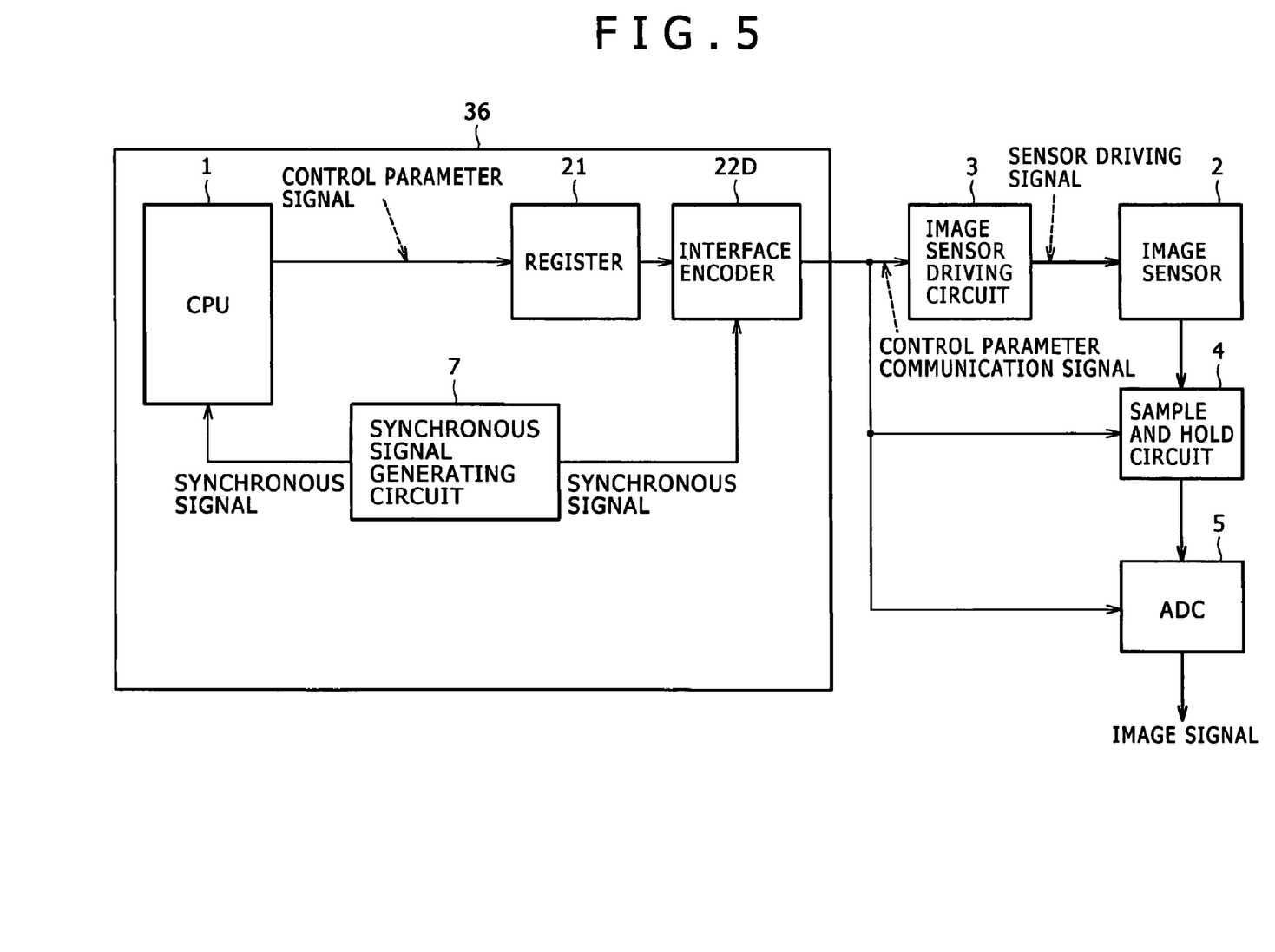
FIG. 5 is a block diagram showing a configuration of an image pickup device to which a communication timing changing method according to an embodiment 3 of the present invention is applied.

FIG. 5 is a block diagram showing a configuration of an image pickup device to which a communication timing changing method according to an embodiment 3 of the present invention is applied. In FIG. 5, portions identical or corresponding to those shown in FIG. 3 are designated with the same reference numerals, and a description thereof is omitted here. A point of difference of the embodiment 3 from the embodiment 1 described above is that in the embodiment 1, the integrated circuit 16 and the CPU 1 are formed on the different chips, respectively, whereas in the embodiment 3, the CPU 1 is formed on the same chip as that of the synchronous signal generating circuit 7, the register 21, and the interface encoder 22D, and thus incorporated in an integrated circuit (electronic device) 36.

According to the embodiment 3, incorporating the CPU 1 in the integrated circuit 36 results in that the CPU 1 can directly write the control parameters to the register 21. Hence, there is offered such an effect that the interface decoder 20 can be removed, and thus the system configuration can be simplified.

In addition, in the embodiment 3 as well, when the CPU 1 makes the setting of the control parameters used to determine the operation states of the analog devices, the control parameters are stored in the register 21, and the communication for setting the control parameters from the register 21 in the analog devices, respectively, is made at the timing (blanking period) which does not impede any of the operations of the analog devices. For this reason, the CPU 1 may store the control parameters in the register 21 at arbitrary timing. As a result, restrictions, for the timing management, imposed on the CPU 1 are relaxed, and thus the programming becomes easy to make.

In addition, in the embodiment 3 as well, when the blanking period is short and the amount of communication is much, the communication processing abilities of the portions in and behind the interface encoder have to be increased. Consequently, there is offered such an effect that it is possible to provide the communication timing changing method and device which are capable of suppressing an increase in power consumption, and of preventing the image signal from getting mixed with the noises along with the communication of the control parameters while suppressing the power consumption and the cost to a necessary minimum as compared with the case where the throughput of the CPU 1 is increased.

Incidentally, in the embodiments 1, 2 and 3 described above, the description has been given with respect to the case where the communication timing changing method is applied to the image pickup device including the image sensor 2, the image sensor driving circuit 3, the sample and hold circuit 4, and the ADC 5 as the analog devices. However, the present invention is not limited to the image pickup device. That is, any other suitable electronic device may be adopted as long as the control parameters used to determine the operation modes of the analog devices used in this electronic device need to be set in the analog devices, and the timing of the communication for setting the control parameters in the analog devices, respectively, can be changed over to another one which does not impede any of the operations of the analog devices without increasing the power consumption and the cost of the CPU.

What is claimed is:

1. A communication timing changing method for changing timing of communication by setting control parameters, from a central processing unit (CPU), used to determine operation modes of analog devices, respectively, over to another operation mode corresponding to a period which does not impede any operations of said analog devices, said method comprising:

generating a synchronous signal synchronized with the period not impeding any operations of said analog devices by a synchronous signal generating circuit included in an integrated circuit;

transferring the control parameters used to determine the operation modes of said analog devices from said CPU to a register, included in the integrated circuit, during operation periods of said analog devices, except for the period which does not impede any operations of said analog devices, to store the control parameters in said register based on the synchronous signal generated by said synchronous signal generating circuit; and managing timing of communication, between said register and said analog devices, by setting the control parameters stored in said register in said analog devices, respectively, synchronously with the period which does not impede any operations of said analog devices by at least one interface encoder based only on the synchronous signal generated by said synchronous signal generating circuit, wherein setting the control parameters in said analog devices includes transferring and storing the control parameters in said analog devices, said analog devices being separate from the integrated circuit.

2. The communication timing changing method according to claim 1, wherein the at least one interface encoder provided so as to correspond to said analog devices, respectively, manage the timing of the communication, between said register and said analog devices, by setting the control parameters stored in said register in said analog devices, respectively, in parallel synchronously with the period which does not impede any operations of said analog devices.

3. The communication timing changing method according to claim 1, wherein the at least one interface encoder manages the timing of the communication, between said register and said analog devices, by setting the control parameters stored in said register in said analog devices, respectively, in serial synchronously with the period which does not impede any operations of said analog devices.

4. The communication timing changing method according to claim 1, wherein said analog devices are an image sensor driving circuit, a sample and hold circuit, and an analog/digital converter of an image pickup device, and the period which does not impede any operations of said analog devices is a blanking period except for a period required to output an image signal.

5. An electronic device to change timing of communication by setting control parameters, from a processor (CPU), used to determine operation modes of analog devices, respectively, over to another operation mode corresponding to a period which does not impede any operations of said analog devices, said electronic device comprising:

an integrated circuit including,
  a synchronous signal generating circuit to generate a synchronous signal synchronized with the period not which does not impede any operations of said analog devices;
  a register to transfer the control parameters used to determine the operation modes of said analog devices from said CPU during operation periods of said analog devices except for the period which does not impede any operations of said analog devices to store the control parameters based on the synchronous signal generated by said synchronous signal generating circuit; and
  a communication section to communicate with said analog devices, and to set the control parameters stored in said register in said analog devices, respectively, synchronously with the period which does not impede any operations of said analog devices based only on the synchronous signal generated by said synchronous signal generating circuit, wherein the communication section sets the control parameters in said analog devices by transferring and storing the control parameters in said analog devices, said analog devices being separate from the integrated circuit.

6. The electronic device according to claim 5, wherein said communication section includes interface encoders provided to correspond to said analog devices, respectively, and said interface encoders communicate with said analog devices in parallel synchronously with the period which does not impede any operations of said analog devices.

7. The electronic device according to claim 5, wherein said communication section includes a single interface encoder to communicate with said analog devices in serial, and said single interface encoder communicates with said analog devices in serial synchronously with the period which does not impede any operations of said analog devices.

8. The electronic device according to claim 5, wherein said analog devices are an image sensor driving circuit, a sample and hold circuit, and an analog/digital converter of an image pickup device, and the period which does not impede any operations of said analog devices is a blanking period except for a period required to output an image signal.

9. The electronic device according to claim 5, wherein said synchronous signal generating circuit, said register, said communication section, and said CPU are formed on the same chip.

\* \* \* \* \*